Oct. 12, 1971  G. S. HARBEN, JR  3,611,475
APPARATUS AND METHOD FOR REMOVING FEATHERS FROM POULTRY
Filed Aug. 26, 1969  3 Sheets-Sheet 1

INVENTOR
GROVER S. HARBEN, JR.

BY  Newton, Hopkins, & Ormsby
ATTORNEYS

INVENTOR
GROVER S. HARBEN, JR.
BY Newton, Hopkins, & Ormsby
ATTORNEYS

United States Patent Office 3,611,475
Patented Oct. 12, 1971

3,611,475
APPARATUS AND METHOD FOR REMOVING FEATHERS FROM POULTRY
Grover S. Harben, Jr., Gainesville, Ga., assignor to Gainesville Machine Company, Inc., Gainesville, Ga.
Filed Aug. 26, 1969, Ser. No. 853,100
Int. Cl. A22c 21/02
U.S. Cl. 17—11.1
13 Claims

ABSTRACT OF THE DISCLOSURE

Feather removal from chickens or other fowl is achieved by rotating opposing sets of flexible picking fingers against the body of a chicken or other fowl as it is conveyed along a predetermined path therebetween. The picking fingers are secured to frames positioned on opposite sides of the path of travel and at least one frame is continuously reciprocated transversely of the path for continuously varying the degree of tightness by which the chicken or other fowl is gripped by the opposing sets of picking fingers.

BACKGROUND OF THE INVENTION

The present invention relates generally to chicken picking machines and more particularly to an improved machine for removing the feathers from a chicken or other fowl being conveyed along a predetermined path of the type having a plurality of flexible fingers extending toward the chicken or other fowl and rotating about axes of rotation perpendicular to the direction of travel of the chicken or other fowl.

Specifically, this invention relates to an improvement in a machine of the type described by C. V. Corn, et al., in U.S. Pat. No. 3,197,809, issued Aug. 3, 1965. The machine described therein is provided with a plurality of flexible rubber picking fingers which extend from opposing, parallel circular plates into the path of travel of a chicken or other fowl suspended head down from a shackle and carried by a conveyor belt through the machine. The plurality of flexible rubber picking fingers are rotated about axes of rotation perpendicular to the direction in which the chicken or other fowl is conveyed through the machine in such a manner that the body of the chicken or fowl is engaged on both sides by fingers moving in the same direction as its direction of travel and by fingers moving in a direction opposite to its direction of travel through the machine. This rotation of the plurality of flexible rubber picking fingers results in circular paths of picking finger motion and causes each flexible picking finger to have a component of force when it strikes the body of the chicken or other fowl which is along the arc of a circle and a component of force which is radial because of centrifugal force, and in this manner the body of the chicken or other fowl is completely cleaned of all feathers by the machine.

Although this machine has proven to be effective in removing the feathers from all portions of the body of a chicken or other fowl in a generally satisfactory manner, it has exhibited a tendency toward bruising and burning the fowl especially whenever a chicken or other fowl being conveyed through the machine is of such proportions as to be more tightly engaged by the fingers than in the usual case.

SUMMARY OF THE INVENTION

It is, therefore, an object of the present invention to provide an improved apparatus for removing the feathers from all portions of a chicken or other fowl without bruising or burning the body thereof.

Another object of this invention is to provide an improved machine of the type using a plurality of rotating flexible picking fingers for removing all the feathers from a chicken or other fowl which will not readily bruise or burn the body of the chicken or other fowl as it is conveyed therethrough.

Still another object of the present invention is to provide an improved method of removing all the feathers from a chicken or other fowl.

These and other objects are attained by providing the rotating circular plates on which the flexible picking fingers are mounted with a limited reciprocating movement along the axes thereof, whereby the flexible picking fingers thereon are continuously and periodically extended into the path along which the chicken or other fowl is being conveyed and withdrawn therefrom.

BRIEF DESCRIPTION OF THE DRAWINGS

Still other objects, features and advantages of the present invention will be more readily appreciated as the same becomes more clearly understood from the following detailed description when considered in connection with the accompanying drawings in which like characters designate like or corresponding parts throughout the several views and wherein.

DESCRIPTION OF A PREFERRED EMBODIMENT

Figure 1:
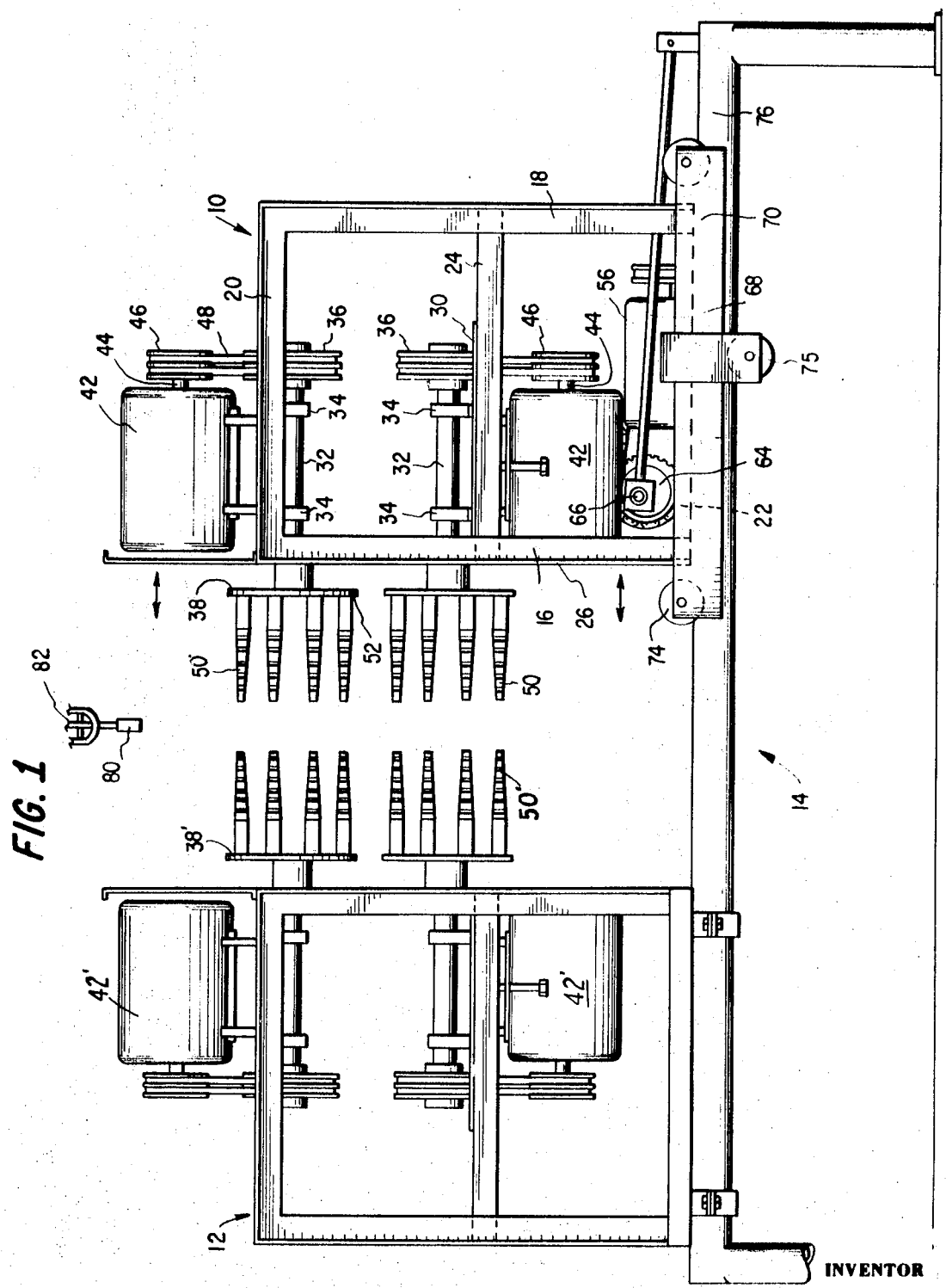
FIG. 1 is an end elevational view of a machine embodying the principles of the present invention for removing all the feathers from a chicken or other fowl and showing the parallel opposed banks of flexible picking fingers and a device for reciprocably moving one bank relative to the other along an axis perpendicular thereto.

Referring now to the drawings, the feathers removal machine of the present invention comprises a right picking frame generally indicated at 10, a left picking frame generally indicated at 12, and a main frame generally indicated at 14. The main frame 14 supports the right frame 10 and the left frame 12 in positions parallel to each other and adjustability of the picking frames vertically, laterally and longitudinally on the main frame 14 is provided by known means (not illustrated) such as disclosed in detail in the aforementioned U.S. Pat. No. 3,197,809.

Figure 2:
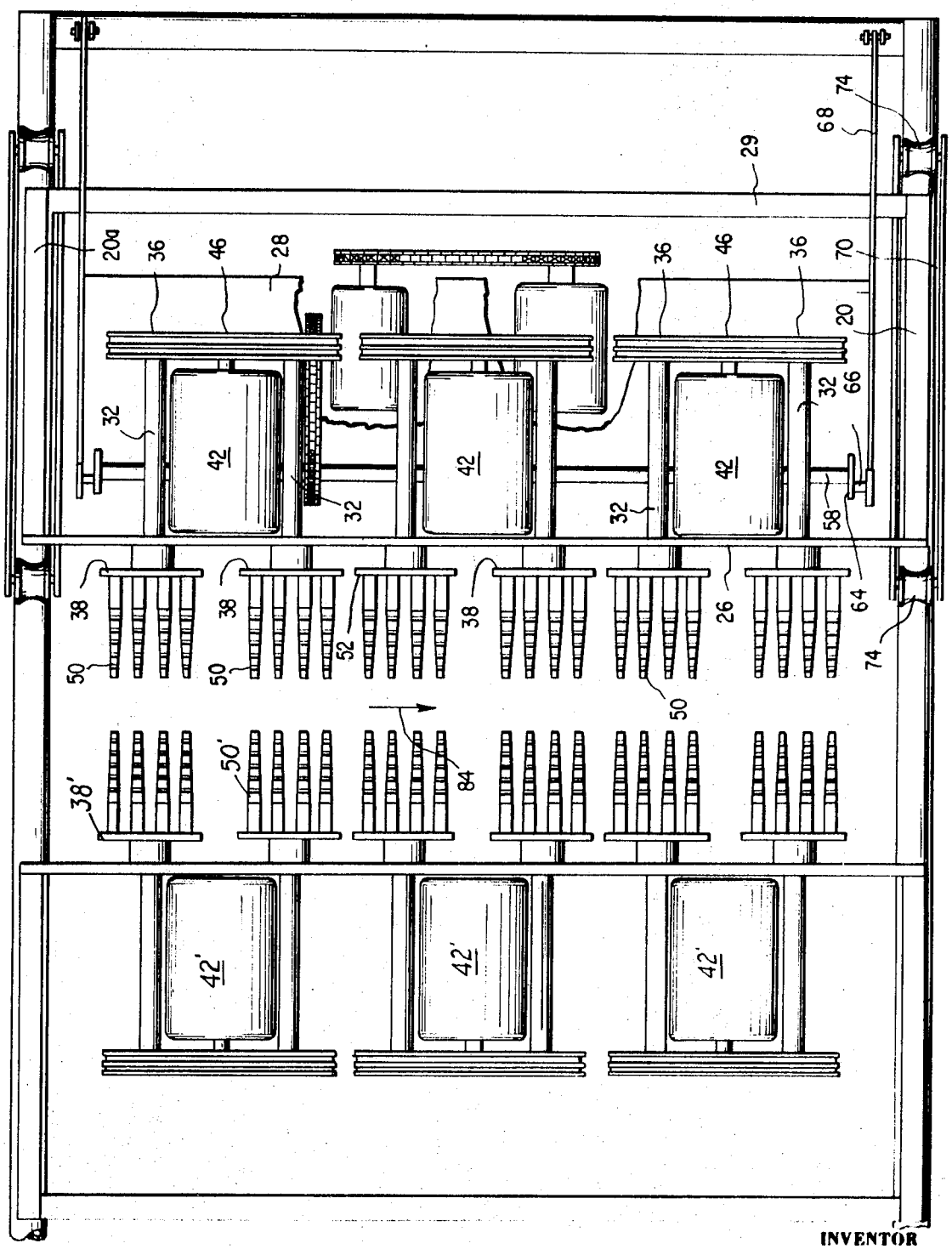
FIG. 2 is a plan view of the apparatus shown in FIG. 1.

As is clearly evident from FIGS. 1 and 2, the right picking frame 10 and the left picking frame 12 are substantially mirror images of each other and the detailed description to follow will therefore be restricted to the right picking frame 10. However, the part of the left picking frame 12 corresponding to each part of the right picking frame 10 described is indicated in the drawings by the prime of the reference number used for the right picking frame 10 and the construction of the left picking frame 12 will accordingly be readily understood from the description of the right picking frame 10.

The right picking frame 10 has a vertically extending frame member 16 at one side and another vertically extending frame member 18 at its other side. A lateral member 20 extends between the upper ends of the vertical frame members 16 and 18 and a similar lateral member 22 extends between the lower or base ends of the vertical frame members 16 and 18 to thereby form a vertically oriented rectangular frame, which construction is best shown in FIG. 1. An intermediate lateral member 24 is secured to the vertical frame members 16 and 18 approximately midway between the upper and lower ends thereof in parallel relationship with the lateral members 20 and 22. The frame members are secured to each other by any suitable attachment means, as by welding or the like. A corresponding vertically oriented rectangular frame is disposed on the main frame 14 rearwardly of and in parallel relationship with the frame constructed of vertical frame members 16 and 18 and lateral frame members 20, 22 and 24, and the corresponding frame members of the rearwardly disposed frame are designated by the subscript letter $a$.

Turning now to FIG. 2, it may be seen that a vertically disposed flat rectangular plate 26 is secured to the upright frame members 16 and 16$a$, perpendicularly disposed with relation to lateral frame members 20, 22 and 24 and the main frame 14, and thereby closes one side or end of the right picking frame 10. Secured to the upper lateral frame members 20 and 20$a$ and lying in the same plane thereof in perpendicular relationship with the closure plate 26 is a flat rectangular support member 28 and similarly secured to the intermediate lateral frame members 24 and 24$a$ and lying in the plane thereof in parallel relationship with the support member 28, and thereby perpendicular to the closure plate 26, is another flat rectangular support member 30. A longitudinally disposed frame member 29 is shown connecting the lower ends of the upright frame members 18 and 18$a$. A similarly disposed longitudinal frame member 31 connects the lower ends of the vertical frame members 16 and 16$a$.

Positioned beneath and along the length of the upper support member 28 are six plate axles 32 each of which is rotatably inserted through a pair of axle support brackets 34 and positioned above and along the length of the intermediate support member 30 are six plate axles 32 each of which also is rotatably inserted through a pair of axle support brackets 34. The axle support brackets 34 are positioned so that the plate axles 32 are parallel to each other with their centerlines perpendicular to the rectangular plate 26 and so that the upper six plate axles and the lower six plate axles 32 are, respectively, more or less equally spaced between the upright frame members 18 and 18$a$.

One end of each plate axle 32 carries a pulley 36 and the other end of each plate axle 32, which extends beyond the rectangular plate 26, carries a circular plate 38. The number of circular plates 38 mounted in this manner on each of the picking frames 10 and 12 may be varied as desired. It has been found, however, that twelve circular plates 38 mounted on each picking frame in the manner indicated provide good results.

Figure 3:
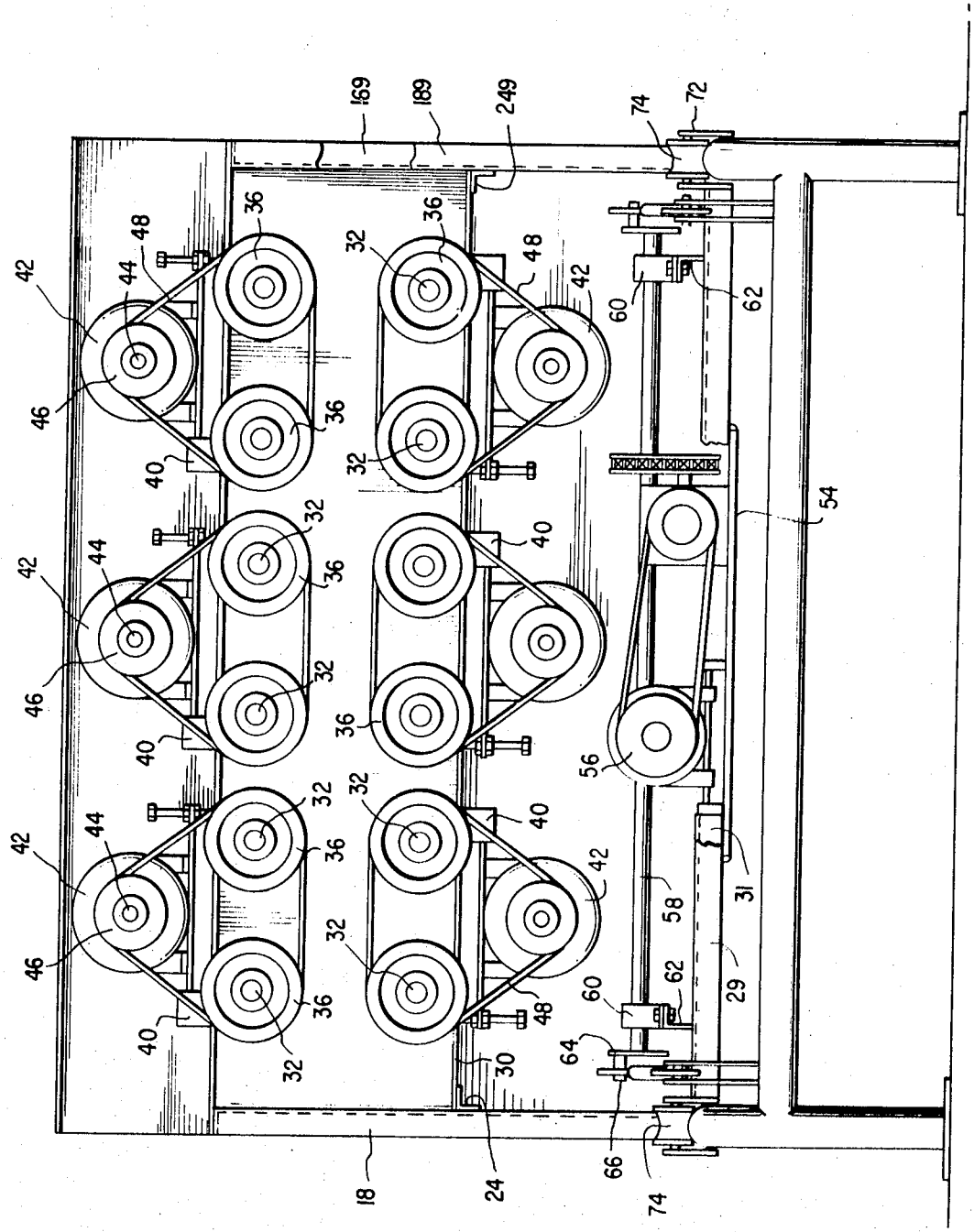
FIG. 3 is a side elevational view of the apparatus illustrated in FIG. 1 showing that side of the frame supporting the right bank of flexible picking fingers most remote from the path of a chicken or other fowl being conveyed through the machine.

Three mounting frames 40 are secured to the upper surface of the upper support members 28 and three like mounting frames 40 are secured to the lower surface of the intermediate support member 30, as shown most clearly in FIG. 3. An electrical motor 42 of known type having a gear reduction mechanism (not shown) of known type integrally associated therewith is fixedly positioned on each mounting frame 40. The drive shaft 44 of each of the motors 42 carries a pulley 46 and operation of the motors 42 in known manner causes rotation of the pulleys 46 associated therewith. A belt 48 extends from the pulley 46 of each motor 42 to and around an adjacent pair of pulleys 36 disposed on axles 32 which are secured to the opposite surface of the support member 28 or 30, as the case may be, from that on which the motor 42 is mounted, thence back around the pulley 46 to its point of beginning in the manner indicated in FIG. 3. When the motors 42 are driven in a clockwise direction as viewed in FIG. 3, this arrangement of the belts 48 causes all of the pulleys 46 and 36 to be rotated in a clockwise direction as viewed in FIG. 3. This clockwise rotation of the pulleys 46 and 36 causes a corresponding rotation in a clockwise direction, as viewed from the driving side of the plate 26, of the circulate plates 38.

Each of the circular plates 38 carries a plurality of elongated flexible rubber picking fingers 50 of known type. When a circular plate 48 is not rotating, the free ends and bodies of the picking fingers 50 extend perpendicularly from a face 52 of the circular plate opposite the supporting frame therefor and transversely of the path through which a chicken or other fowl is conveyed between the picking frames 10 and 12. The number of picking fingers 50 on each plate 38 may vary. However, in the specific embodiment illustrated herein, there are eight picking fingers on each of the plates 48 arranged thereon equidistantly spaced along a circle.

Mounted on a base support 54 secured between the longitudinally disposed frame members 29 and 31 of the right picking frame 10 is an electrical motor 56 of known type for turning an elongated shaft 58. The shaft 58 is positioned beneath the intermediate support member 30 and is disposed perpendicular to the vertically oriented rectangular frame constructed of the frame members 16, 18, 20 and 22. The ends of the elongated shaft 58 are rotatably inserted through a pair of support brackets 60, each of which is secured to one of a pair of spaced lateral frame members 62 disposed between the longitudinal frame members 29 and 31.

A disc member 64 is secured to each end of the shaft 58 for rotation therewith and each disc 64 is provided on its surface most remote from the shaft 58 with an eccentric pin 66. Secured to each eccentric pin 66 for relative rotational movement therebetween is one end of an eccentric rod 68, the other end of which is pivotally secured to the main frame 14.

The right picking frame 10 is mounted on forwardly and rearwardly disposed carriages 70 and 72. Each carriage 70 and 72 includes a pair of spaced upper rollers or wheels 74 and a clamp-supported lower roller or wheel 75 for engaging accordingly a laterally disposed bar or rod 76 for providing displacement laterally of the right picking frame 10 relative to the main frame 14. It may be seen, therefore, that as the motor 56 turns the shaft 58, the discs 64 secured thereon are in turn rotated, thereby effectively moving the pin 66 and the end of the rod 68 thereon about an eccentric path. Since the other end of the rods 68 are pivotally anchored to the main frame 14, the right picking frame 10 is caused to move with its carriages 70 and 72 in a reciprocating fashion along a limited lateral path relative to the main frame 14 and to the stationary left picking frame 12.

OPERATION

The operation of the apparatus described herein is substantially like that of the chicken picking machine disclosed in U.S. Pat. No. 3,197,809. Thus, when a chicken or other fowl suspended head lowermost from a shackle 80 carried by a conveyor chain 82 a conventional known type passes between the right picking frame 10 and the left picking frame 12 along the line of motion 84 indicated in FIG. 2, that portion of its body nearest the shackle 80 is engaged by picking fingers 50 of each circular supporting plate 38 and 38' moving in its direction of motion and downward and that portion most remote from the shackle 80 is engaged by picking fingers 50 of each plate 38 and 38' moving opposite to its direction of travel and upward. Moreover, as the circular plates 38 and 38' rotate, the picking fingers 50 bend away from the axes of rotation of the plates 38 and 38' because of centrifugal force such that the flexible rubber picking fingers 50 orient themselves across the circle in which each picking finger rotates. As a result, the body of a chicken or other fowl carried between the picking frames 10 and 12 is engaged by the bodies of the picking fingers 50 as the bodies of the picking fingers 50 move with a lateral or sidewise wiping motion.

A principal feature of the present invention is the continuous reciprocating motion of the right picking frame 10. Thus, as the chicken or other fowl passes between the picking frames 10 and 12, the motor 56 rotates the shaft 58 to thereby rotate the discs 64 secured thereon and turn the eccentrics 66. The eccentric rods 68, because they are each fixed at one end to the main frame 14, are operative to transform the rotary motion of the shaft 58 into a limited reciprocating movement of the picking frame 10 relative to the picking frame 12. Such movement of the right picking frame 10 is readily obtained through the wheeled carriages 70 and 72 upon which it is mounted. This continuous reciprocating movement of the picking frame 10 and the rotating picking fingers 50 carried thereby into the path through which the chicken or other fowl is conveyed and back therefrom provides alternately and continuously a smooth intensification of the tightness of the grip exerted by the picking fingers 50 of opposing circular plates 38 and 38' on the chicken or other fowl followed by a gradual relaxation thereof. This kneading-like action is effective in substantially eliminating the problem of burning the body of the chicken or other fowl encountered heretofore by feather removing machines of the type described.

What is claimed is:

1. In a poultry picking machine through which fowl are conveyed along a predetermined path, the combination comprising:
  a base;
  at least one pair of oppositely facing rotatively driven picking finger support means disposed adjacent said path and on opposite sides thereof;
  a plurality of picking fingers carried by each of said support means projecting toward said path for picking feathers from said fowl passed therebetween;
  platform means for sustaining said picking finger support means disposed on one side of said path on said base and movably disposed on said base in a direction substantially transverse to said path; and,
  means for alternately and continuously moving said platform means from an initial position on said base through a predetermined distance toward said path and for returning said platform means to said initial position.

2. The machine set forth in claim 1, wherein said platform moving means comprises:
  a rotatable shaft disposed on said platform means substantially parallel to said path,
  a disc secured to one end of said shaft and rotatable therewith,
  an eccentric pin disposed on said disc,
  an arm disposed at one end of said eccentric pin and pivotally secured at the other end thereof to said base.

3. The machine set forth in claim 2, wherein said base includes a guide means; and,
  said platform means includes a plurality of rollers secured thereto and engaged with said guide means for movement therein.

4. In a poultry picking machine through which fowl are conveyed along a predetermined path comprising, in combination:
  (a) a frame support means, said frame support means including means defining a passageway adapted to be longitudinally aligned with said predetermined path;
  (b) a poultry picking assembly supported on said frame support means, said poultry picking assembly including a plurality of picking fingers movably supported thereon and including drive means for moving at least some of said picking fingers in a path of picking movement substantially parallel to said passageway and operable for removing feathers from poultry in response to poultry being conveyed along said predetermined path through said passageway and in contact with said fingers; and
  (c) cyclically operable control means operatively associated with said picking assembly for automatically moving at least some of said poultry picking fingers in a path of picking movement arranged substantially at right angles to said passageway, from an initial position through a predetermined distance toward said passageway and returning said fingers to said initial position.

5. In a poultry picking machine as described in claim 4 further characterized in that said frame support means includes two poultry picking assemblies, with one assembly mounted thereon adjacent each side of said passageway and wherein at least one of said poultry picking assemblies is movably mounted and automatically driven through said cycle of operation.

6. In a poultry picking machine as described in claim 4 further characterized in that said poultry picking assembly includes a plurality of rotatably driven support heads and wherein said picking fingers are mounted on said support heads and adapted to be rotated about axes disposed substantially at right angles to said passageway.

7. In a poultry picking machine through which fowl are conveyed along a predetermined path comprising, in combination:
  (a) a frame support means, said frame support means including means defining a passageway adapted to be longitudinally aligned with said predetermined path;
  (b) a poultry picking assembly, said poultry picking assembly including a plurality of picking fingers movably supported thereon and operable for removing feathers from poultry in response to poultry being conveyed along said predetermined path through said passageway and in contact with said fingers;
  (c) means for supporting said poultry picking assembly on said frame support means adjacent one side of said passageway for translating movement along a path and in a direction transverse to said passageway; and
  (d) cyclically operable control means for automatically moving said poultry picking assembly along said transverse path from an initial position through a predetermined distance toward said passageway and returning said picking assembly to said initial position.

8. In a poultry picking machine as described in claim 7 further characterized in that said frame support means includes two poultry picking assemblies, with one assembly mounted thereon adjacent each side of said passageway and wherein at least one of said poultry picking assemblies is movably mounted and automatically driven through said cycle of operation.

9. In a poultry picking machine as described in claim 7 further characterized in that said picking fingers are movably supported on said poultry picking assembly for movement in a plane substantially parallel to said predetermined path and said passageway.

10. In a poultry picking machine as described in claim 7 further characterized in that said poultry picking assembly includes a plurality of rotatably driven support heads and wherein said picking fingers are mounted on said support heads and adapted to be rotated about axes disposed substantially at right angles to said passageway.

11. In a poultry picking machine through which fowl are conveyed along a predetermined path comprising, in combination:
  (a) a frame support means;
  (b) a first poultry picking assembly mounted on said frame support means, said first poultry picking assembly including a plurality of operable picking fingers movably supported thereon for removing feathers in a picking operation;
  (c) a second poultry picking assembly mounted on said frame support means, said second poultry picking assembly including a plurality of operable picking fingers movably supported thereon for removing feathers in a poultry picking operation, said second poultry picking assembly being detailed in location relative to said first poultry picking assembly to define a poultry picking passageway therebetween and wherein said passageway is adapted to be aligned with said predetermined path;

(d) means for movably supporting at least one of said poultry picking assemblies for translating movement along a path and in a direction transverse to said passageway; and (e) cyclically operable control means operatively associated with said movably mounted poultry picking assembly for effecting an automatic cycle of movement of said poultry picking assembly from an initial position through a predetermined distance toward said path and for returning said picking assembly to said initial position.

12. A poultry picking machine as described in claim 11 further characterized in that each of said poultry picking assemblies include a number of rotatably driven picking heads having a plurality of picking fingers supported thereon for operable movement in a picking operation and wherein said plurality of rotatably driven heads are supported on said assemblies for rotation about axes disposed substantially at right angles to said passageway.

13. A poultry picking machine as described in claim 11 further characterized in that said frame support means includes means defining a guide track support means and wherein said movably mounted poultry picking assembly is supported on said guide track means for movement therealong in said transverse direction relative to said passageway and wherein said cyclically operable control means includes a rotatably driven element having an eccentrically mounted element and including means operatively connected between said eccentrically mounted element and said frame support means whereby said poultry picking assembly will be moved through said automatic cycle of movement during a cycle of rotary movement of said eccentrically mounted element.

References Cited

UNITED STATES PATENTS

| | | | |
|---|---|---|---|
| 2,571,034 | 10/1951 | Harvey | 17—11.1 |
| 2,603,831 | 7/1952 | Sharp | 17—11.1 |
| 2,743,477 | 5/1956 | Barker et al. | 17—11.1 |
| 3,235,904 | 2/1966 | Brown et al. | 17—11.1 |

LUCIE H. LAUDENSLAGER, Primary Examiner

U.S. Cl. X.R.

17—47